Jan. 11, 1955     I. C. BLAKE ET AL     2,699,459
PRIMARY CELL
Filed Sept. 22, 1953     2 Sheets-Sheet 1
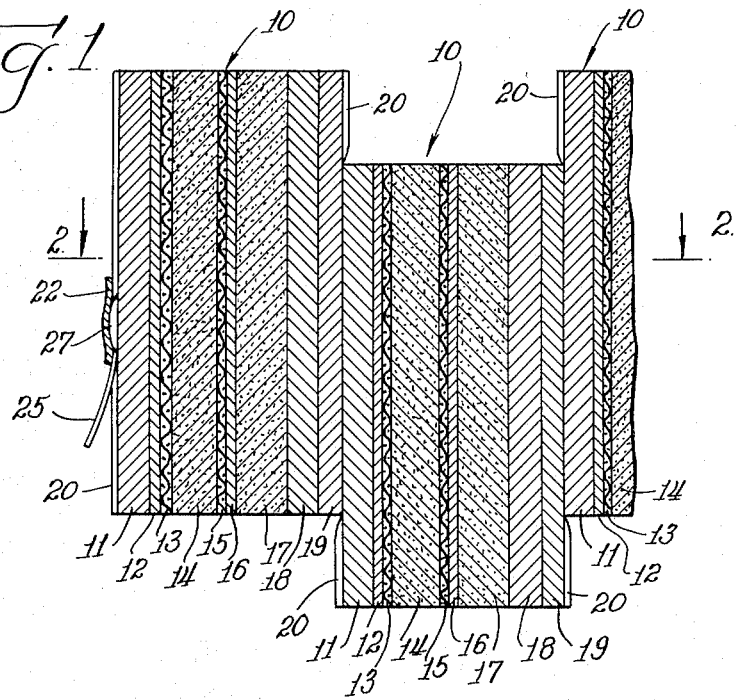
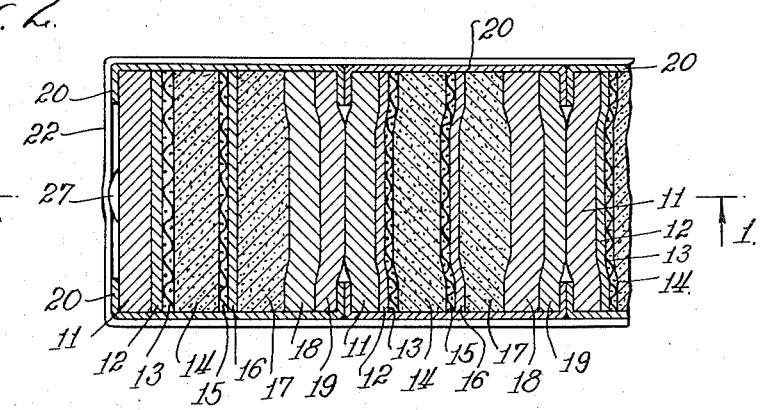
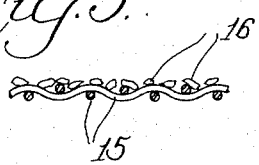
INVENTORS:
Milton E. Wilke
and Ivan C. Blake
By: Jones, Zesch & Darbo
Attys.

Jan. 11, 1955  I. C. BLAKE ET AL  2,699,459
PRIMARY CELL
Filed Sept. 22, 1953  2 Sheets-Sheet 2
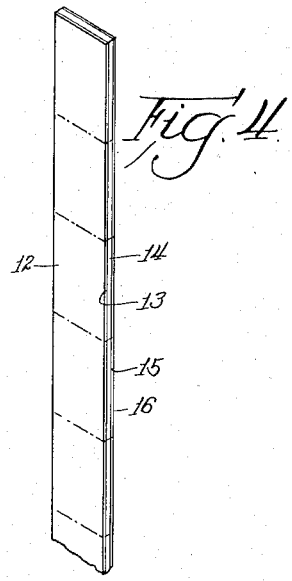
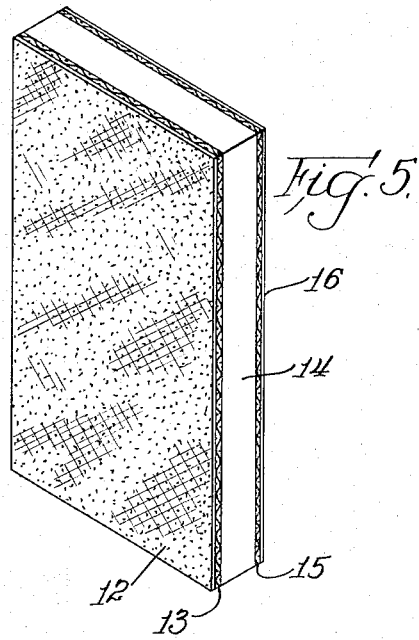
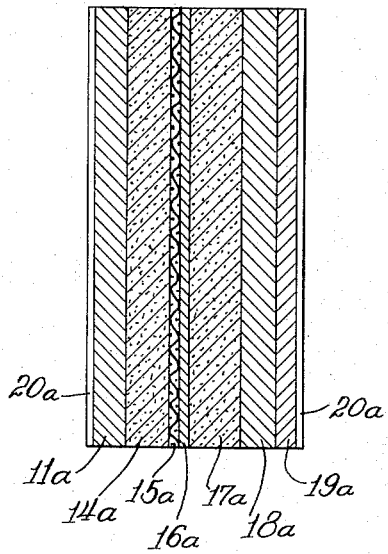
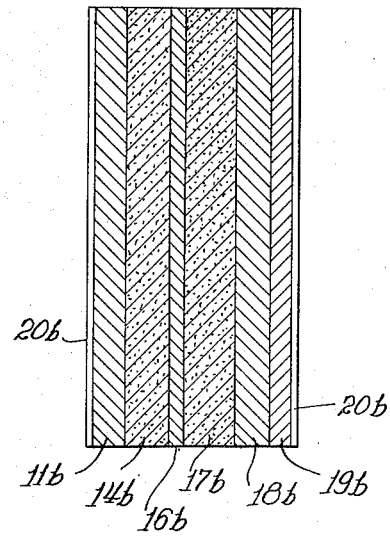
INVENTORS:
Milton E. Wilke
and Ivan C. Blake
By:- Jones, Jesch & Darbo
Attys.

United States Patent Office 2,699,459
Patented Jan. 11, 1955

2,699,459

PRIMARY CELL

Ivan C. Blake, Harrington Park, N. J., and Milton E. Wilke, Freeport, Ill., assignors to Burgess Battery Company, Freeport, Ill., a corporation of Delaware Application September 22, 1953, Serial No. 381,686

7 Claims. (Cl. 136—111)

This invention relates to improvements in primary cells having a depolarizing cathode of cuprous chloride. In particular, the invention relates to a cell of the character described in which a member is provided which arrests the undesired migration of cuprous ions from the cuprous chloride cathode to the anode. More particularly the invention relates to the provision in such a cell of a cuprous ion arrester member which is in the form of a pervious lamina of a conductive substance such as graphite.

An important application of the present invention is with a primary cell of the flat type in which the elements are thin and flat and are arranged in stacked, sandwich-like relation. The embodiments which are specifically described are deferred-action primary cells which are activated by bringing the electrolyte-receptive elements thereof, which includes the depolarizing cathode, in contact with an activating liquid or electrolyte, as by dipping or immersing said cells in the activating liquid. The electrolyte-receptive elements absorb the liquid and the cells are rendered operative.

Difficulty has been encountered in the use of cells having a cuprous chloride depolarizing cathode in that overheating and a useless consumption of the negative electrode or anode takes place within the cells, whereby the efficiency of said cells is materially reduced. It has been found that there is a substantial action in which cuprous cations migrate from the cathode and deposit on the anode, resulting in local action and corrosion and the useless dissipation of energy. In cells of the flat type the anode and the depolarizing cathode of cuprous chloride are physically in close proximity and the tendency of cuprous ions to migrate to the anode is very strong.

It is the principal object of the invention to provide a construction for primary cells of the character described in which such overheating and dissipation of energy due to migration of cuprous ions are materially reduced.

Another object is to provide a primary cell having the improved characteristic described and having low internal resistance.

Other objects and advantages will become apparent from the following description in which several embodiments of the invention are described.

Briefly, the objects are accomplished by providing in a cell of the character described an ion arrester member which is a pervious lamina of conductive carbon or other suitable substance arranged across the path of ions between the cathode and the anode.

In the drawings:

Fig. 1 is a sectional elevation on an enlarged scale, taken along line 1—1 of Fig. 2, of a portion of a battery utilizing cells which represent one embodiment of the invention;

Fig. 2 is a sectional view along line 2—2 of Fig. 1;

Fig. 3 is a fragmental sectional view, on an enlarged scale, of an embodiment of an arrester member of the invention;

Fig. 4 is a perspective view of an elongated blank composed of a sandwich-like arrangement of ribbons of cuprous chloride depolarizer, supporting members and an arrester member, which blank is adapted to be severed into lengths to form composite units for inclusion in a cell;

Fig. 5 is a perspective view of a composite unit, severed from the blank of Fig. 4;

Fig. 6 is a sectional elevation on enlarged scale of a primary cell which represents another embodiment of the invention, and Fig. 7 is a sectional elevation similar to Fig. 6 of another embodiment of the invention.

Referring to Figs. 1 and 2, the cells 10 of the battery are each composed of a plurality of juxtaposed thin, flat rectangular cell elements arranged in sandwich-like relationship. By way of illustration and not of limitation, said elements comprise, from left to right, the positive terminal 11 composed of copper; the conductive member 12, composed of a layer or lamina of conductive carbon; the flexible supporting medium 13 for the cathode; the positive electrode or depolarizing cathode 14 containing cuprous chloride as the essential element; a second supporting member 15; the ion arrester member 16; the electrolyte-receptive element 17 of bibulous paper such as blotting paper; the negative electrode or anode 18 of magnesium, and the negative terminal 19 of copper. The broad exterior surfaces of the terminals 11 and 19 form the facing surfaces of the cell. In the drawing the thickness of the elements is exaggerated, the elements 11 and 19 in practice being of foil thickness, and the arrester member 16 having a thickness of only a fraction of a thousandth of an inch. The arrester member 16 and supporting member 15 will be described in detail hereinafter.

The elements comprising an individual cell are mechanically joined together in a unit and maintained in parallel juxtaposed relationship by binding them together under pressure by the substantially electrolyte-impervious dielectric tape 20. Said tape engages and covers the two opposite long edges of the group, which are made up of the long edges of the cell elements, and the marginal portions of the terminal faces, leaving exposed the major portions of the broad facing surfaces of the terminals and the two short edges of the group which are made up of the short edges of the cell elements. The enclosed long edges are designated as the side edges and the unenclosed edges are designated as the ends of the cell. The tape 20 has a coating of pressure-sensitive adhesive upon its interior surface whereby a firm adhesive attachment is made between the contacting surfaces of the cell elements and the tape. Each cell is an integral unit.

In accordance with the invention, the ion arrester member 16 is arranged across the path of ions between the cathode 14 and the anode 18. In the preferred embodiment, the arrester member 16 is a pervious lamina or screen of particles of conductive carbon. Any suitable form of conductive carbon may be used such as natural or artificial graphite, partially graphitized carbon, or the like. It is in finely divided or powdered condition, a particle size which will pass through a 20 mesh per inch sieve, or finer, being suitable. The arrester member 16 is carried by the support member 15.

The support member 15 is a thin, flexible fabric having substantial porosity, such as cloth, paper, wire screen, or the like. The carbon may be applied to the support in suspension in a volatile vehicle such as carbon tetrachloride containing a binder such as polystyrene. A thin lamina or coating of the composition may be applied to the support by spraying, brushing or other suitable method, the thickness being controlled so as to result in a porous or pervious layer or screen. The vehicle evaporates, leaving a coherent, porous lamina of carbon and binder.

With the cloth or paper support, the powdered carbon may be dusted uniformly over the area of the support so as to form a pervious layer or screen of the carbon particles upon and within the material of the support. A cloth support having the carbon dusted upon it is the preferred construction. In such case the pervious carbon screen is only a fraction of a thousandth of an inch thick, but it, nevertheless, effectively performs the arresting function.

In Fig. 3 is illustrated the thin, flexible sheet of non-conductive fabric 15, having the pervious lamina or screen 16 of carbon particles thereon. The screen of carbon particles 16 is the arrester member and the fabric 15 is the medium for supporting said member in the planar space immediately adjacent the cathode 14 of cuprous chloride. Said screen 16 serves as an effective ion arrester for preventing migration of cuprous ions from the cathode 14 to the anode 18. At the same time, the fabric support carrying the conductive carbon screen preserves in the cell the advantages of flexibility and low internal resistance.

As stated heretofore, the cathode 14 contains cuprous chloride as the essential element. This may be applied as a layer to the supporting fabric 15, for example, to the side opposite that carrying the arresting screen 16. In making the embodiment of Figs. 1 and 2, the composition is conveniently applied between the two fabrics 13 and 15. A suitable composition is a mixture of powdered cuprous chloride and a conductive substance such as graphite or conductive carbon and a binder such as polystyrene dissolved in a solvent such as carbon tetrachloride. The composition may be applied to the fabric in any suitable manner. As an example, the composition is made up into a mass having the consistency of a thick mud. The two fabrics in continuous strip form are drawn through the mud in converging relation until they are the desired distance apart and then in parallel relation. The composition fills the space between the strips and that which adheres to the exterior surfaces is scraped off by knives. Powdered graphite is then dusted upon the exterior surfaces of the fabrics 13 and 15 to form the elements 12 and 16. There is thereby formed a unitary blank in continuous ribbon form composed of the elements 12, 13, 14, 15 and 16, as shown in Fig. 4. Said blank is severed at the broken lines into sections to form the composite unit shown in Fig. 5 which is incorporated in the cell. The solvent evaporates from the cathode mass 14, leaving a plastic coherent layer between the fabrics 13 and 15. The material of layer 14 and the particles of carbon 12 both penetrate the fabric 13 to form a low resistance connection between the cathode 14 and the positive terminal 11. In the completed cell, the second fabric 13 assists in supporting the cathode 14 and the carbon 12 provides conductivity between said cathode and the terminal 11. While for manufacturing convenience it is in the same form as the ion restrictor screen 16 it does not function as such a screen.

As shown in Fig. 1, a plurality of flat cells 10 such as have been described are arranged in a sandwich-like juxtaposed relationship to form a battery, each cell being offset lengthwise with respect to the cells adjacent thereto and the assembly of cells being held together under pressure by the encircling band or tape 22 or other suitable means, so that the broad facing surface of the positive terminal 11 of one cell is in pressure conductive contact with the negative terminal 19 of the next adjacent cell. When assembled in a battery, the electrolyte-receptive element 17 becomes compressed and the other elements comprising the cells bend or flex to accommodate the thicknesses of edge-binding tape 20, as illustrated in Fig. 2.

The battery is of the deferred-action type and is kept free of electrolyte until it is placed in use. The unenclosed ends of the cells are then brought in contact with an activating liquid, which is conveniently done by dipping a side, such as the side shown uppermost in Fig. 1, into a body of activating liquid. The liquid is absorbed by the electrolyte-receptive element 17 and the depolarizing cathode 14 and moistens these two elements. The supporting fabric 15 is also moistened by the liquid. A suitable activating liquid is a dilute aqueous solution of sodium chloride, for example a water solution containing 5 percent of sodium chloride, based on the weight of the solution. The solution, when absorbed into the cell as described, is the electrolyte of the cell and the cathode 14 and anode 18 are both in access relation to the electrolyte.

It has been found that by interposing an arrester member of the character described between the cuprous chloride cathode and the anode, that is, across the path of ions between said cathode and anode, the cuprous ions are prevented from migrating to the anode and are reduced out of solution and deposited on the surfaces of the arrester member. Although movement of the cuprous ions is restrained as described, the ion arrester member does not appreciably hinder the normal current-producing ionic flow within the cell.

While the ion arrester member is preferably composed of conductive carbon particles as described hereinbefore, it may also be composed of other conductive substances which are not substantially electronegative with respect to the cathode or positive electrode, such as particles of copper, silver, gold or the like. In other words, the arrester member is composed of a substance such as carbon or copper which in the cell electrolyte assumes an electrode potential which is substantially the same as that of the cathode, or a substance such as silver or gold which assumes a lower potential. As an example, the screen may be formed by painting the supporting member 15 with a silver paint or spraying a coating of copper particles thereon, the operation in every case being controlled so as to provide a porous or pervious layer or screen.

While for purposes of mechanical strength it is preferred to provide a supporting member on each side of the depolarizing cathode as has been described, the supporting member 13 may be omitted if desired. Such a structure is illustrated in Fig. 6. A separate description of the cell is not given since the cell is similar to the cell of Figs. 1 and 2 with the exception that the supporting member 13 and the conductive element 12 at the side of the cathode toward the positive terminal 11 are omitted. In Fig. 6 corresponding parts are designated by the same numerals as in Figs. 1 and 2 with the addition of the suffix "a" to each numeral. In this embodiment, the composition containing cuprous chloride is applied to the fabric 16a in any suitable manner to form the conductive depolarizing cathode layer 14a. Said cathode 14a makes direct conductive contact with the positive terminal 11a.

Another embodiment of the invention is illustrated in Fig. 7. This embodiment is similar to the cell of Figs. 1 and 2 with the difference that the flexible supporting elements 13 and 15 and the conductive element 12 are omitted, and the pervious carbon arrester member is supported directly on the surface of the depolarizing cathode. The corresponding elements are designated in Fig. 7 by the same numerals as in Figs. 1 and 2 with the addition of the suffix "b." The arrester member 16b is applied directly to the surface of the cathode 14b by spraying or brushing a carbonaceous composition upon said surface or by dusting powdered carbon thereon, all as described hereinbefore in connection with the application of the arrester member 16 to the support 15.

Only a few embodiments of the invention have been described and illustrated, and variations therefrom within the spirit of the invention will occur to those skilled in the art. For example, the negative electrode may be of zinc instead of magnesium, and the terminals 11 and 19, instead of being of copper, may be of any suitable material such as silver, gold or platinum. The cell elements and cells may be of shapes other than shown, such as square, oval, etc. Other variations will occur to those skilled in the art.

Invention is claimed as follows:

1. In a primary cell having an anode and a depolarizing cathode containing cuprous chloride as an essential ingredient, an ion arrester member comprising a pervious lamina of conductive carbon across the path of ions between said cathode and said anode.

2. In a primary cell having an anode and a depolarizing cathode containing cuprous chloride as an essential ingredient, an ion arrester member arranged across the path of ions between said cathode and said anode comprising a pervious lamina of a conductive substance which is not substantially electronegative with respect to said cathode.

3. In a flat primary cell comprising a plurality of sheet-form cell elements including an anode and a depolarizing cathode containing cuprous chloride as an essential ingredient, an ion arrester member interposed between said cathode and anode sheets comprising a pervious lamina of a conductive substance which is not substantially electronegative with respect to said cathode.

4. In a primary cell, comprising a plurality of flat cell elements in sandwich-like, juxtaposed arrangement including a sheet-form anode and a sheet-form depolarizing cathode containing cuprous chloride as an essential ingredient, an ion arrester member interposed between said cathode and said anode comprising a thin, flexible, pervious, supporting medium and a pervious coating on said medium of a conductive substance which is not substantially electronegative with respect to said cathode.

5. In a primary cell, comprising a plurality of flat cell elements in sandwich-like juxtaposed arrangement including a sheet-form anode and a sheet-form depolarizing cathode containing cuprous chloride as an essential ingredient, an ion arrester member interposed between said cathode and said anode comprising a thin, flexible, fabric and a pervious coating of conductive carbon upon the surface of said fabric.

6. A depolarizing cathode for a primary cell, comprising a sandwich-like arrangement of sheet-like elements comprising a sheet of composition containing cuprous chloride as an essential ingredient, a sheet of porous, non-conductive fabric on a broad surface of said sheet of composition, and a pervious lamina of a conductive substance which is not substantially electronegative with respect to said cuprous chloride carried by and substantially coextensive with said fabric sheet.

7. A depolarizing cathode for a primary cell, comprising a sandwich-like arrangement of elongated ribbon-like strips comprising a strip of composition containing cuprous chloride as an essential ingredient, a strip of porous fabric on each of the broad surfaces of said strip of composition, and a pervious lamina of conductive carbon carried by and substantially coextensive with each of said fabric strips.

References Cited in the file of this patent

UNITED STATES PATENTS

| | | |
|---|---|---|
| 2,579,743 | Kurlandsky | Dec. 25, 1951 |
| 2,639,306 | Fischbach | May 19, 1953 |